United States Patent [19]

Armbruster

[11] 4,062,423

[45] Dec. 13, 1977

[54] SAWHORSE WITH GUIDE FOR CIRCULAR SAW

[76] Inventor: Joseph M. Armbruster, 2501 N.E. 46th St., Lighthouse Point, Fla. 33064

[21] Appl. No.: 768,703

[22] Filed: Feb. 15, 1977

[51] Int. Cl.² ............................................ F16M 11/00
[52] U.S. Cl. .................................. 182/129; 182/181; 269/295
[58] Field of Search ......................... 182/129, 181–185, 182/224; 269/295

[56] References Cited

U.S. PATENT DOCUMENTS

| | | | |
|---|---|---|---|
| 1,612,390 | 12/1926 | Maynard | 269/295 |
| 2,324,196 | 7/1943 | Crozier | 182/129 |
| 3,177,974 | 4/1965 | Martin | 182/129 |

Primary Examiner—Reinaldo P. Machado
Attorney, Agent, or Firm—Clarence A. O'Brien; Harvey B. Jacobson

[57] ABSTRACT

A horizontal elongated and upwardly opening channel structure is provided and includes upstanding longitudinal sides interconnected by means of a bottom extending between and connected to the lower marginal portions of the sides. The sides include at least one pair of corresponding upwardly opening notches formed therein aligned along a path extending transversely of the channel structure and a pair of generally parallel guide structures are supported from and extend between corresponding upper marginal portions of the sides on opposite sides of the aforementioned notches with the opposite ends of the guide structures projecting outwardly of the remote sides of the sides. The guide structures are provided for guiding the supporting opposite side marginal portions of the support plate of a power saw therefrom for guided movement of the power saw along the guide structures with the cutting blade of the saw disposed in the aforementioned path and receivable through the aforementioned notches for cutting through a workpiece disposed in the channel structure.

10 Claims, 6 Drawing Figures

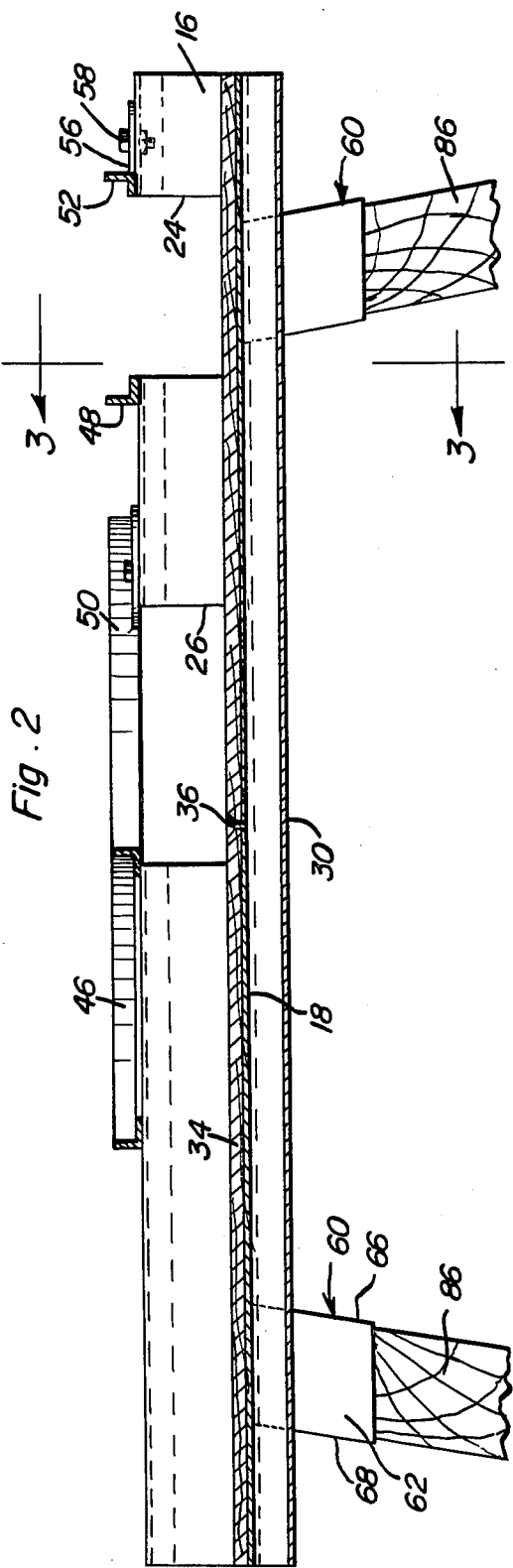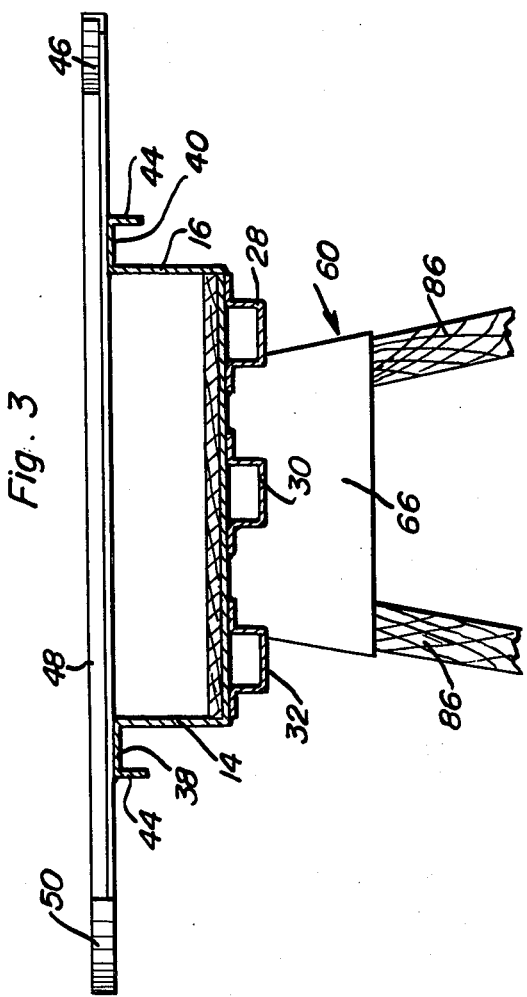

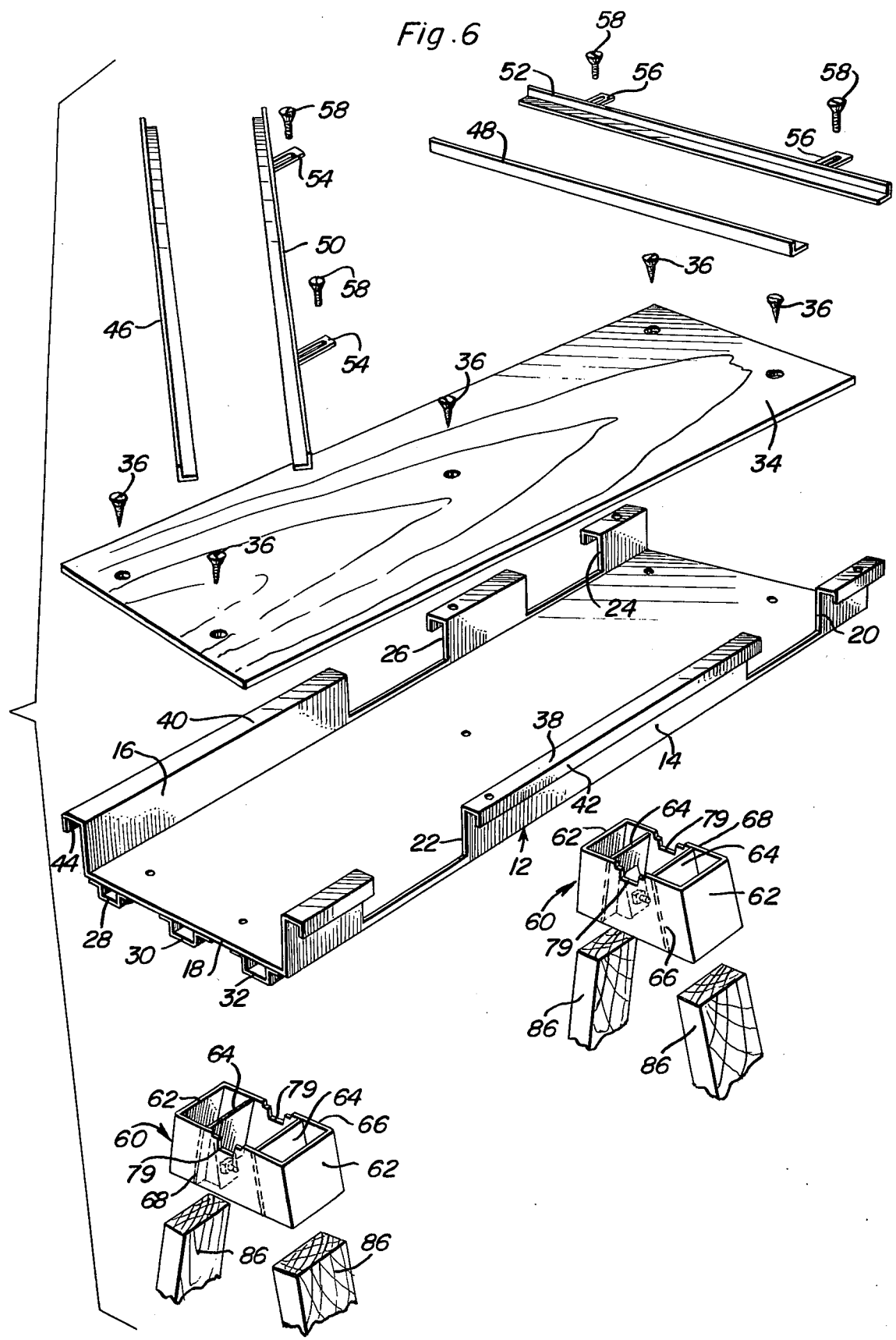

SAWHORSE WITH GUIDE FOR CIRCULAR SAW

BACKGROUND OF THE INVENTION

Various forms of power saw guides have been heretofore provided and some have been designed specifically for use in conjunction with power circular saws. However, most of the these previously known saw guides are usable in conjunction with only small workpieces and do not have the strength or dimensional capacity to handle largerr workpieces, such as beams, joists and studs. In addition, most of the previously known power saw guide structures have not been constructed in a manner whereby heavy workpieces may be supported at a convenient elevation above the floor in order that a power saw operator may perform necessary cuts in the workpieces supported from the guide with ease and little effort.

Accordingly, a need exists for a power saw guide of sturdy construction so as to be adapted to support heavy workpieces and of a size enabling larger workpieces to be supported therefrom in an elevated position above a work surfaces upon which the operator of a power saw may be standing.

Examples of previously known power saw guides and other structures including some of the general structural and operational features of the instant invention are disclosed in U.S. Pat. Nos. 2,630,146, 2,630,147, 2,656,860, 2,324,196, 2,903,026, 3,177,947 and 3,741,063.

BRIEF DESCRIPTION OF THE INVENTION

The saw guide of the instant invention comprises a wide channel-shaped member provided with means at its opposite ends for releasably supporting depending legs therefrom. The sides of the channel member have transversely aligned upwardly opening notches formed therein and a pair of guide structures are supported from upper marginal portions of the sides and extend therebetween. The guide structures are disposed on opposite sides of the aforementioned notches and are provided to guidingly support the base plate of a circular saw therefrom whose saw blade is advanced along a path extending generally centrally through the aforementioned notches.

The main object of this invention is to provide a power saw guide for use in conjunction with circular saws and which will be capable of supporting heavy workpieces therefrom.

Another object of this invention is to provide a guide structure in accordance with the preceding object and constructed in a manner so as to properly support large workpieces in a manner such that various cuts may be performed thereon by the associated power saw.

Still another object of this invention is to provide a power saw guide of the sawhorse configuration whereby the workpieces supported therefrom to have saw cuts made therein may be supported at a convenient elevation for the operator of the associated saw.

Yet another object of this invention is to provide an apparatus in accordance with the preceding objects and which is constructed in a manner whereby it may be marketed in disassembled form and readily assembled after purchase.

A further object of this invention is to provide a power saw guide of the type equipped with depending support legs and constructed in a manner whereby the support legs therefor may be readily removed for compact storage of the saw guide when it is not in use.

A final object of this invention to be specifically enumerated herein is to provide a sawhorse-type of guide for a circular saw constructed in accordance with the preceding objects and which will conform to conventional forms of manufacture, be of simple construction and easy to use, so as to provide a device that will be economically feasible, long lasting and relatively trouble free in operation.

These together with other objects and advantages which will become subsequently apparent reside in the details of construction and operation as more fully hereinafter described and claimed, reference being had to the accompanying drawings forming a part hereof, wherein like numerals refer to like parts throughout.

BRIEF DESCRIPTION OF THE DRAWINGS

FIG. 2 is an enlarged, fragmentary, longitudinal, vertical, sectional view taken substantially upon the plane in FIG. 3 is a fragmentary, transverse, vertical, sectional view taken substantially upon the plane indicated by the section line 3—3 of FIG. 2;

FIG. 6 is an exploded, perspective view of the sawhorse and guide structure of the instant invention.

DETAILED DESCRIPTION OF THE INVENTION

Figure 1:
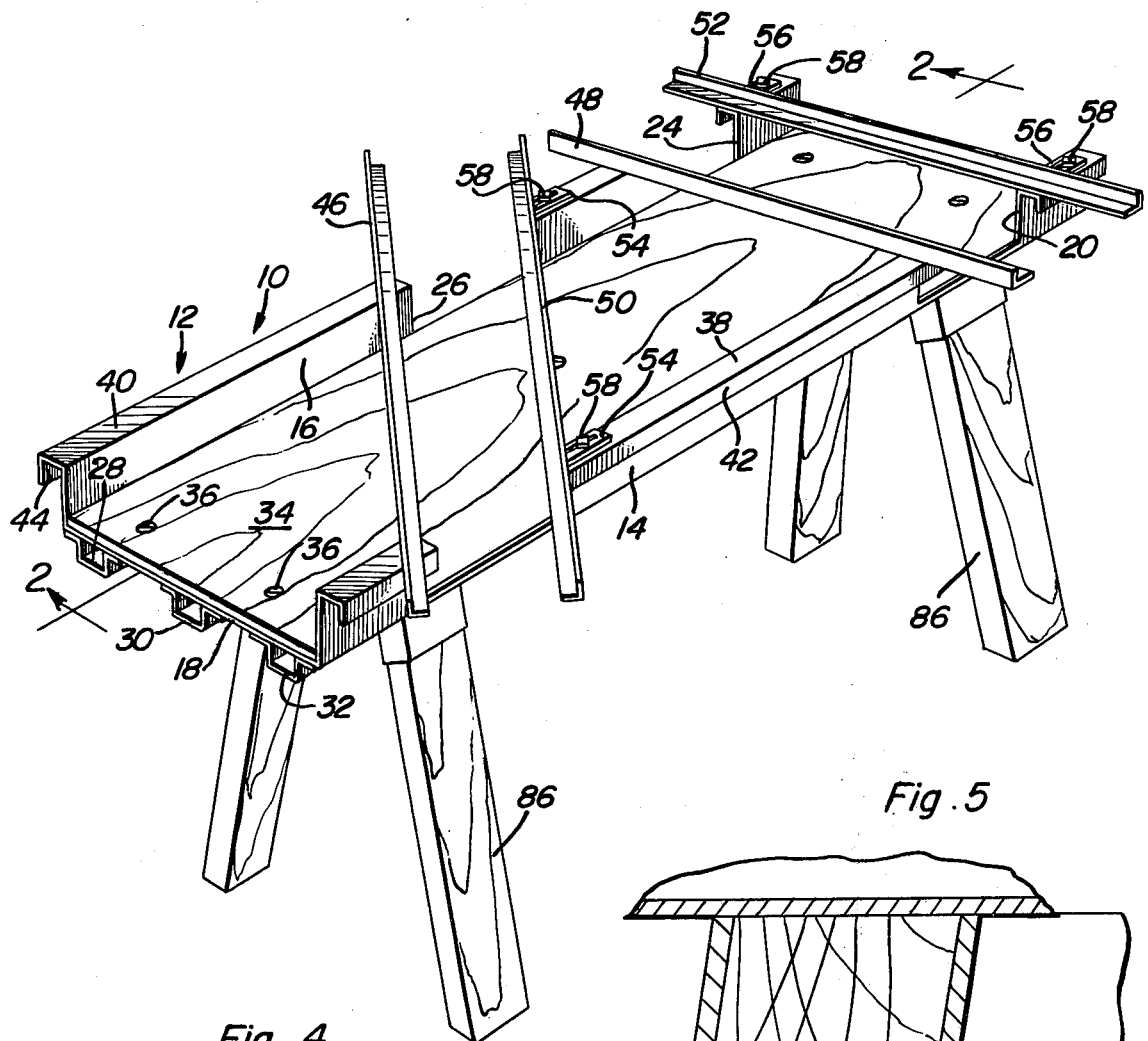
FIG. 1 is a perspective view of the sawhorse and power saw guide structure of the instant invention.
Figure 4:
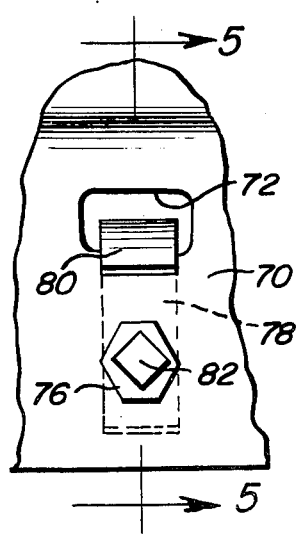
FIG. 4 is a fragmentary, enlarged, elevational view of the inner side of one of the downwardly opening support leg receiving sockets of the sawhorse and guide structure and illustrating the leg clamp structure supported therefrom.
Figure 5:
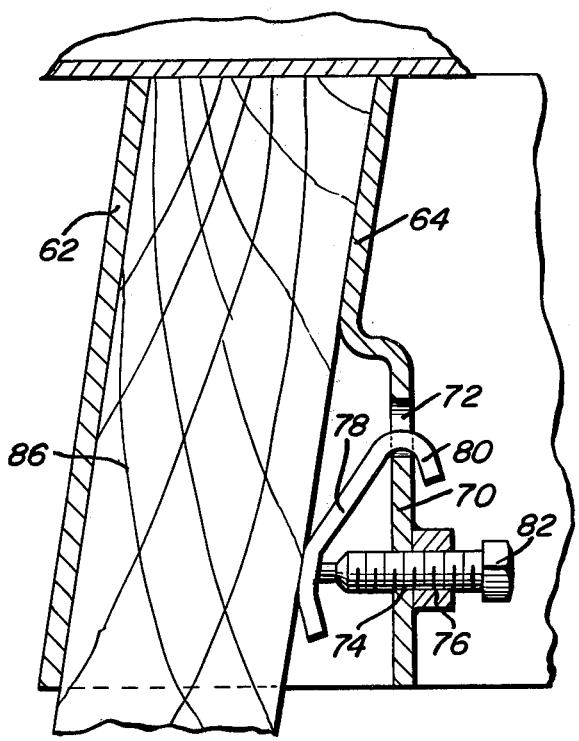
FIG. 5 is an enlarged, fragmentary, vertical, sectional view taken substantially upon the plane indicated by the section line 5—5 of FIG. 4.

Referring now more specifically to the drawings, the numeral 10 generally designates the sawhorse and guide structure of the instant invention. The structure 10 includes a main horizontal channel member referred to in general by the reference numeral 12. The channel member 12 is constructed of ten gauge metal and includes a pair of upstanding opposite sides 14 and 16 interconnected at their lower ends by means of an integral bight portion or bottom wall 18. The side 14 opposite end notches 20 and 22 formed therein and the side 16 has notches 24 and 26 formed therein. The notches 20 and 24 are aligned along a transverse path normal to the longitudinal center line of the channel member 12 and the notches 22 and 26 are aligned along a path inclined substantially 45 degrees relative to the longitudinal center line of the channel member 12.

The underside of the bottom wall 18 has three transversely spaced and longitudinally extending reinforcing channel members 28, 30 and 32 secured thereto and the lower portions of the notches 20, 22, 24 and 26 are spaced above the bottom wall 18. A one and one-eighth inch thick particle board 34 is snugly received between the sides 14 and 16 and overlies the bottom wall 18 and is secured thereto by means of suitable fasteners 36. The upper surface of the particle board 34 is slightly elevated above the lower extremities of the notches 20, 22, 24 and 26.

The upper marginal edges of the sides 14 and 16 terminate in outwardly directed horizontal flanges 38 and 40 which in turn terminate outwardly in downturned flanges 42 and 44.

A first pair of stationary angle member guides 46 and 48 are secured to the flanges 38 and 40 at the left hand sides of the notches 22, 26 and 20, 24 and a second pair of adjustable angle member guides 50 and 52 including slotted mounting brackets 54 and 56 extend across and are secured to the flanges 38 and 40 on the right hand sides of the notches 22, 26 and 20, 24 by means of suitable fasteners 58 secured downwardly through the slotted brackets 54 and 56 and to the flanges 38 and 40. Thus, the second pair of angle member guides 50 and 52 may be shifted longitudinally of the channel member 12 and secured in parallel relation to the guides 46 and 48 in proper spaced relation therefrom in order to guidingly support the base plate of a circular saw therefrom.

Each end of the channel member 12 includes a leg socket construction referred to in general by the reference numeral 60 and each leg socket construction comprises a pair of outer plates 62, a pair of inner plates 64, and a pair of end plates 66 and 68. The end plates 66 and 68 of each socket construction 60 extend transversely of the corresponding end of the channel member 12 and the outer plates 62 extend between and are secured to corresponding ends of the end plates 66 and 68. The inner plates 64 are spaced inwardly from the opposite ends of the end plates 66 and 68 and extend between and are secured to the latter whereby each pair of inner and outer plates 64 and 62 defines a downwardly opening socket between the corresponding ends of the end plates 66 and 68. Each of the inner plates 64 includes an offset lower end portion 70 having a horizontal slot 72 formed therethrough and each portion 70 also has a bore 74 formed therethrough below the corresponding slot 72 and a threaded nut 76 is secured to the side of the inner plate 64 remote from the corresponding outer plate 62 in registry with the corresponding bore 74. A clamp plate 78 including a hooked tongue 80 is disposed immediately inwardly of the portion 70 of each inner plate 64 with the tongue 80 hooked over the lower marginal edge portion of the corresponding slot 72 and a clamp bolt 82 is threaded through each of the nuts 76 and projects through the bores 74 and engages the corresponding side of the lower marginal edge portion of the clamp plate 78. The leg socket constructions 60 are each welded to the underside of the bottom wall 18 and the adjacent sides of the channel members 28 and 32 are notched to receive the adjacent portions of the constructions 60 therein, whereas the central upper marginal portions of the end plates 66 and 68 are notched as at 79 to receive the adjacent portions of the channel member 30 therein.

Four leg members 86 are provided and may be in the form of two-by-fours and have one set of corresponding ends thereof upwardly telescoped into the sockets defined by the constructions 60 and the bolts 82 may be tightened in order that the clamp plates 78 may maintain the legs 86 in position.

In operation, a piece of lumber to be cut may be cradled within the channel member 12 below the guides 46, 48, 50 and 52. Assuming that the lumber has been properly marked in order to form either a 90 degree cut or a 45 degree cut therein, the base plate of a circular saw may be guidingly engaged with the appropriate guides and the latter may thus be utilized to properly guide the power saw during the desired cutting operation. Of course, when it is desired to store the sawhorse and guide structure 10, the bolts 82 may be loosened and the legs 86 may be removed.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention.

What is claimed as new is as follows:

1. A horizontal elongated and upwardly opening channel structure including upstanding longitudinal sides interconnected by means of a bottom extending between and connected to the lower marginal portions of said sides, said sides including at least one pair of corresponding upwardly opening notches formed therein aligned along a path extending transversely of said channel structure, a pair of generally parallel guide structures supported from and extending between corresponding upper marginal portions of said sides on opposite sides of said path with the opposite ends of said guide structures projecting outwardly of the remote sides of said sides, said guide structures being adapted to guidingly support opposite side marginal portions of the support plate of a power saw therefrom for guided movement of said plate along said guide structures with the cutting blade of said saw disposed in said path.

2. The combination of claim 1, wherein said channel structure includes downwardly projecting opposite end leg means for supporting the channel structure in elevated position relative to a horizontal support surface upon which the lower ends of said leg means rest.

3. The combination of claim 2, wherein the opposite ends of said channel structure include downwardly opening socket defining structures supported therefrom, said leg means comprise opposite end upstanding elongated leg members whose upper ends are removably upwardly telescoped into said socket defining structures.

4. The combination of claim 3, wherein each of said socket defining structures includes a clamping jaw element shiftably supported therefrom on one side of the socket defined thereby for movement within the socket toward and away from the other side thereof, and adjusting means carried by each of said socket defining structures and operatively associated with the corresponding jaw element for adjusting the latter toward the other side of the corresponding socket, whereby to clampingly secure the corresponding leg member in the socket between said jaw element and said other side of said socket.

5. The combination of claim 4, wherein each of said socket defining structures includes peripherally extending wall portions, one of said wall portions including an opening formed therein, said jaw element of each socket defining structure loosely received through said opening, said adjusting means comprising a screw threadedly engaged with each socket defining member and abutted against the corresponding jaw element.

6. The combination of claim 1, wherein said bottom includes a plurality of transversely spaced channel members underlying extending along and secured to said bottom wall.

7. The combination of claim 1, including a panel member overlying and secured to said bottom wall, said panel member being constructed of a material which may be cut by a wood saw, the lower marginal portions of said notches being disposed above said bottom wall and below the upper surface of said panel member.

8. The combination of claim 1, wherein said sides include two pairs of upwardly opening notches formed therein with one pair of notches being generally centered relative to a path extending transversely of said channel member at right angles relative to the longitudinal centerline thereof and the other pair of notches being generally centered relative to a path extending transversely of said channel member angularly displaced generally 45° relative to the longitudinal centerline thereof.

9. The combination of claim 8, wherein said channel structure includes downwardly projecting opposite end leg means for supporting the channel structure in elevated position relative to a horizontal support surface upon which the lower ends of said leg means rest.

10. The combination of claim 9, wherein the opposite ends of said channel structure include downwardly opening socket defining structures supported therefrom, said leg means comprise opposite end upstanding elongated leg members whose upper ends are removably upwardly telescoped into said socket defining structures.

* * * * *